US008860360B2

(12) United States Patent
Medina

(10) Patent No.: US 8,860,360 B2
(45) Date of Patent: Oct. 14, 2014

(54) DEVICE INTERFACE AND APPARATUS

(75) Inventor: Eitan Medina, Palo Alto, CA (US)

(73) Assignee: Marvell World Trade Ltd., St. Michael (BB)

( * ) Notice: Subject to any disclaimer, the term of this patent is extended or adjusted under 35 U.S.C. 154(b) by 528 days.

(21) Appl. No.: 13/216,491

(22) Filed: Aug. 24, 2011

(65) Prior Publication Data
US 2012/0049789 A1 Mar. 1, 2012

Related U.S. Application Data

(60) Provisional application No. 61/376,609, filed on Aug. 24, 2010.

(51) Int. Cl.
H02J 7/00 (2006.01)
G06F 1/26 (2006.01)
G06F 13/42 (2006.01)

(52) U.S. Cl.
CPC .............. G06F 13/426 (2013.01); G06F 1/266 (2013.01)
USPC ........................................................ 320/103

(58) Field of Classification Search
USPC ........................................................ 320/103
See application file for complete search history.

(56) References Cited

U.S. PATENT DOCUMENTS

| 7,574,551 | B2 * | 8/2009 | Gundam et al. | 710/313 |
| 7,679,316 | B2 * | 3/2010 | Guthrie et al. | 320/107 |
| 7,768,150 | B2 * | 8/2010 | Platania et al. | 307/19 |
| 7,768,239 | B2 * | 8/2010 | Veselic et al. | 320/155 |
| 8,111,040 | B2 * | 2/2012 | Guthrie et al. | 320/107 |
| 8,354,760 | B2 * | 1/2013 | Lanni | 307/24 |
| 8,539,266 | B2 * | 9/2013 | Kawano | 713/300 |
| 2004/0063464 | A1 * | 4/2004 | Akram et al. | 455/559 |
| 2005/0070154 | A1 * | 3/2005 | Milan | 439/502 |
| 2008/0222438 | A1 | 9/2008 | Lin et al. | |
| 2010/0109602 | A1 * | 5/2010 | Chang | 320/103 |

FOREIGN PATENT DOCUMENTS

EP 1 990 887 11/2008

OTHER PUBLICATIONS

The International Search Report and Written Opinion of the international Searching Authority, or the Declaration, for corresponding International Application No. PCT/US2011/048937, mailed Dec. 7, 2011, 10 pages.
Sanjiv Kumar, "SuperSpeed USB 3.0 Specification Revolutionizes an Established Standard," Internet Citation, XP002603029, Nov. 1, 2008, retrieved from the Internet: URL: http://www.chipestimate.com/partner_docs/doc_834573812.pdf?SuperSpeed+USB+3.0+SpecificationRevolutionizes+An+Established+Standard, pp. 1-6.

* cited by examiner

*Primary Examiner* — Edward Tso
*Assistant Examiner* — Ramy Ramadan

(57) ABSTRACT

A first device including a battery, a first connector, a charging module, a sensing module, and a communication module. The first connector includes a power supply pin, a ground pin, two transmit pins, and two receive pins, and connects the first device to a second device. The charging module receives power from the second device via the power supply pin and the ground pin to charge the battery and supplies power from the battery to the second device via the power supply pin and the ground pin. The sensing module senses the power supply pin and the ground pin of the first connector and detects when the first device (i) connects to the second device via the first connector and (ii) disconnects from the second device. The communication module communicates with the second device via the two transmit pins and the two receive pins using a PCIe protocol.

17 Claims, 4 Drawing Sheets

DEVICE INTERFACE AND APPARATUS

CROSS-REFERENCE TO RELATED APPLICATIONS

This present disclosure claims the benefit of U.S. Provisional Application No. 61/376,609, filed on Aug. 24, 2010, which is incorporated herein by reference in its entirety.

FIELD

The present disclosure relates generally to mobile devices and more particularly an interface and apparatus for mobile devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Mobile devices (e.g., cellular phones, notebook computers, tablets, etc.) are typically compact in size and battery-powered. Due to the constraints on physical size, weight, and battery capacity of these devices, the number of input/output interfaces and networking interfaces that can be incorporated in these devices are also generally limited.

SUMMARY

A first device includes a battery, a first connector, a charging module, a sensing module, and a communication module. The first connector is configured to connect the first device to a second device. The first connector includes a power supply pin, a ground pin, two transmit pins, and two receive pins. The charging module is configured to receive power from the second device via the power supply pin and the ground pin to charge the battery and to supply power from the battery to the second device via the power supply pin and the ground pin. The sensing module is configured to sense the power supply pin and the ground pin of the first connector, and based on the sensing, to detect when the first device (i) connects to the second device via the first connector and (ii) disconnects from the second device. The communication module is configured to transmit data to the second device via the two transmit pins using a Peripheral Component Interconnect Express protocol and to receive data from the second device via the two receive pins using the Peripheral Component Interconnect Express protocol.

A first device includes a battery, a first connector, a charging module, and a communication module. The first connector is configured to connect the first device to a second device. The first connector includes a power supply pin, a ground pin, two transmit pins, and two receive pins. The charging module is configured to receive power from the second device via the power supply pin and the ground pin to charge the battery, and to supply power from the battery to the second device via the power supply pin and the ground pin. The communication module is configured to transmit data to the second device via the two transmit pins and to receive data from the second device via the two receive pins.

A system includes a first device having a first connector and a second device having a second connector. Each of the first connector and the second connector consist of a power supply pin, a ground pin, two transmit pins, and two receive pins. When the first device is connected to the second device via the first connector and the second connector, the first device is configured to receive power from the second device via the power supply pin and the ground pin of the first connector to charge a battery of the first device, to supply power to the second device via the power supply pin and the ground pin of the first connector, to transmit data to the second device via the two transmit pins of the first connector, and to receive data from the second device via the two receive pins of the first connector.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
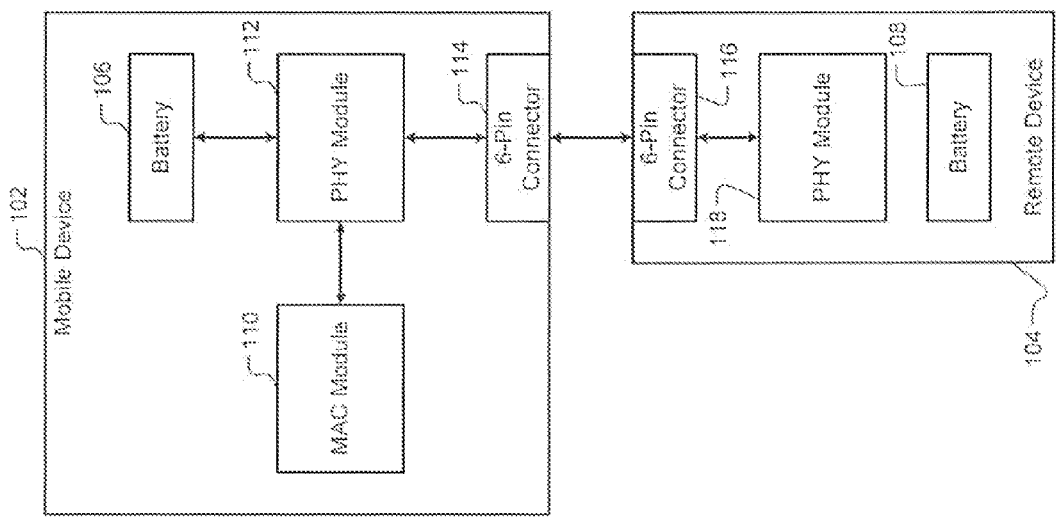
FIG. 1 is a functional block diagram of a system including a mobile device and a remote device connected via connectors according to the present disclosure.

Many mobile devices can be connected to a charging station or a docking station via a connector. Typically, the connector includes a Universal Serial Bus (USB) connector or a Personal Computer Memory Card International Association (PCMCIA) connector. The connector can be used to charge the mobile device when the mobile device is plugged into a charging station. Additionally, the connector can be used to connect the mobile device to a docking station to augment functionality of the mobile device.

The present disclosure relates to an interface for a mobile device, which includes a connector having a low-pin count (also referred to herein as "low pin-count connector") to connect the mobile device to a variety of devices including charging stations, dockings stations, and so on. The low pin-count connector can be used to charge a battery of the mobile device. Additionally, the mobile device can use the low pin-count connector to communicate with a remote device. In one embodiment, the low pin-count connector includes a maximum of 6-pins to provide all the functionalities as described in greater detail below. In another embodiment, the low pin-count connector includes at least 6-pins as described in greater detail below.

In one embodiment, the connector includes at least two power pins, two transmit pins, and two receive pins. The two transmit pins include a power supply pin (e.g., Vcc) and a ground pin (e.g., GND). The two transmit pins include differential transmit pins TX+ and TX−. The two receive pins include differential receive pins RX+ and RX−.

The connector can be used to connect the mobile device to a remote device, which may include a charging station, a docking station, a laptop computer, etc. When the mobile device is connected to a charging station via the connector, the mobile device can receive power from the charging station via the two power pins (Vcc and GND) to charge the battery of the mobile device. In some implementations, when the mobile device is connected to the remote device via the connector, the mobile device can supply power from the battery of the mobile device to the remote device via the two power pins (Vcc and GND).

Additionally, as explained below, the mobile device and/or the remote device can detect connection and disconnection between the mobile device and the remote device by sensing the two power pins (Vcc and GND) of the connector. Accordingly, the mobile device and/or the remote device can detect connection and disconnection between the mobile device and the remote device without using any additional pins.

Further, the mobile device can communicate with the remote device via the connector as follows. The mobile device can transmit data to the remote device via the two transmit pins (TX+ and TX−) using Peripheral Component Interconnect Express (PCIe) protocol. Additionally, the mobile device can receive data from the remote device via the two receive pins (RX+ and RX−) using the PCIe protocol. The mobile device and the remote device can communicate in full duplex mode via the two transmit pins (TX+ and TX−) and the two receive pins (RX+ and RX−) using the PCIe protocol.

In one embodiment, the connector includes only two transmit pins and two receive pins, as described above. In such an embodiment, however, a mobile device can still receive power (or supply power) via one or more pins of the two transmit pins and the two receive pins. In one embodiment, the power is received or supplied during times that communication is not occurring over the one or more pins.

Referring now to FIG. 1, a system 100 including a mobile device 102 and a remote device 104 is shown. The mobile device 102 can communicate with a wireless network. For example, the mobile device 102 can be a cellular phone that can communicate with a cellular network. The mobile device 102 can be a network device (e.g., a client station) that that can communicate with a wireless network (e.g., a WiFi network) and optionally with a cellular network. The mobile device 102 can be a tablet that can communicate with a wireless network.

The remote device 104 can be a charging station, a docking station, a laptop computer, an MP3 player, etc. The mobile device 102 can be powered using an adapter that plugs into a wall outlet. Additionally, the mobile device can be powered using a battery 106. The remote device 104 may also be powered using an adapter that plugs into a wall outlet and/or using a battery 108.

The mobile device 102 includes a medium access control (MAC) module 110, a physical layer (PHY) module 112, and a connector 114. The remote device 104 also includes a connector 116 and a PHY module 118. The connector 116 of the remote device 104 is similar to the connector 114 of the mobile device.

The connector 114 of the mobile device 102 plugs into the connector 116 of the remote device 104. For example, the connector 114 can be a male type connector when the connector 116 is a female type connector, and vice versa. Alternatively, the connectors 114, 116 can be edge-type male/female connectors, and so on.

The MAC module 110 controls the access of the mobile device 102 to a network medium (e.g., air). The PHY module 112 interfaces the mobile device 102 to the network medium. For example, the PHY module 112 includes a suitable network interface or interfaces (e.g., a cellular network interface, a WiFi network interface, etc. (not shown)) to interface the mobile device 102 to one or more networks. The mobile device 102 can include one or more antennas (not shown).

Additionally, the PHY module 112 is connected to the connector 114. When the connector 114 of the mobile device 102 is plugged into the connector 116 of the remote device 104, the PHY module 112 can receive power from the remote device 104 via the connectors 114, 116 to charge the battery 106 of the mobile device 102. Conversely, the PHY module 112 can supply power from the battery 106 of the mobile device 102 to the remote device 104 via the connectors 114, 116. The remote device 104 can use the power received from the mobile device 102 to charge the battery 108 of the remote device 104.

Further, when the mobile device 102 is plugged into the remote device 104, the mobile device 102 and the remote device 104 can communicate via the connectors 114, 116. Specifically, the PHY module 112 can transmit data to the remote device 104 via the connectors 114, 116. Additionally, the PHY module 112 can receive data from the remote device 104 the connectors 114, 116. The PHY module 112 uses the Peripheral Component Interconnect Express (PCIe) protocol to transmit and receive data.

The PHY module 118 of the remote device 104 is connected to the connector 116 of the remote device 104. The PHY module 118 interlaces the remote device 104 to the connector 116. The PITY module 118 of the remote device 104 operates in the same manner as the PHY module 112 of the mobile device 102.

Figure 2:
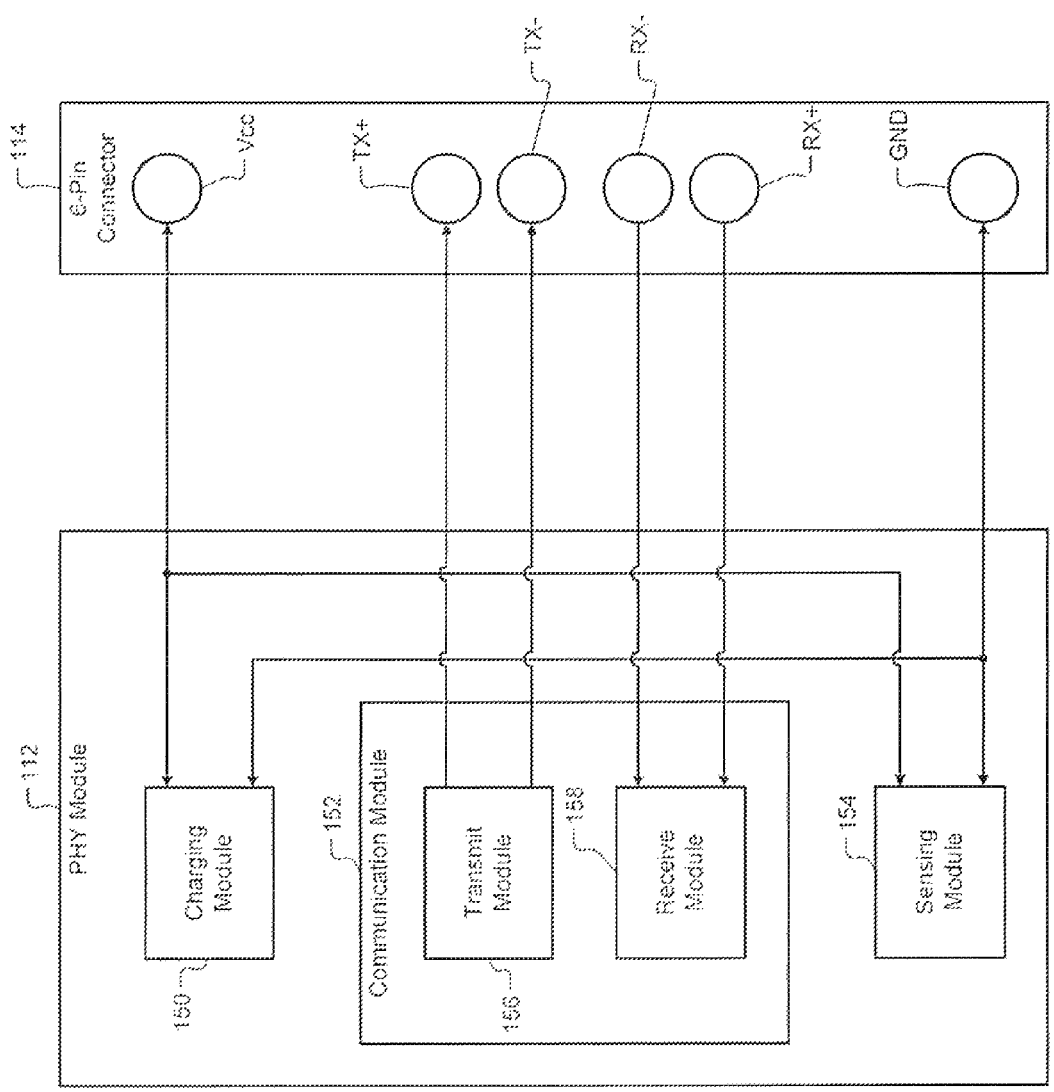
FIG. 2 is a functional block diagram of a physical layer (PHY) module of the mobile device and a connector according to the present disclosure.

Referring now to FIG. 2, the PHY module 112 and the connector 114 of the mobile device 102 are shown in greater detail. The PHY module 118 and the connector 116 of the remote device 104 are identical to the connector 114 of the mobile device 102. In one embodiment, the connector 114 of the mobile device includes only two power supply pins Vcc and GND, two transmit pins TX+ and TX−, and two receive pins RX+ and RX−.

The PHY module 112 includes a charging module 150, a communication module 152, and a sensing module 154. The communication module 152 includes a transmit module 156 and a receive module 158. The charging module 150 charges the battery 106 of the mobile device 102 using power received from the remote device 104 via the two power supply pins Vcc and GND. The charging module 150 can also supply power from the battery 106 to the remote device 104 via the two power supply pins Vcc and GND.

In one embodiment, the transmit module 156 transmits data to the remote device 104 via the two transmit pins TX+ and TX− using the PCIe protocol, and the receive module 158 receives data from the remote device 104 via the two receive pins RX+ and RX− using the PCIe protocol. The mobile device 102 can transmit and receive data to and from the remote device 104 in full duplex mode using the PCIe protocol.

The sensing module 154 senses the two power supply pins Vcc and GND to detect when the mobile device 102 is connected to the remote device 104. Additionally, the sensing module 154 senses the two power supply pins Vcc and GND to detect when the mobile device 102 is disconnected from the remote device 104. Accordingly, additional pins are not needed to detect when the mobile device 102 is connected to the remote device 104 and when the mobile device 102 is disconnected from the remote device 104.

Figure 3A:
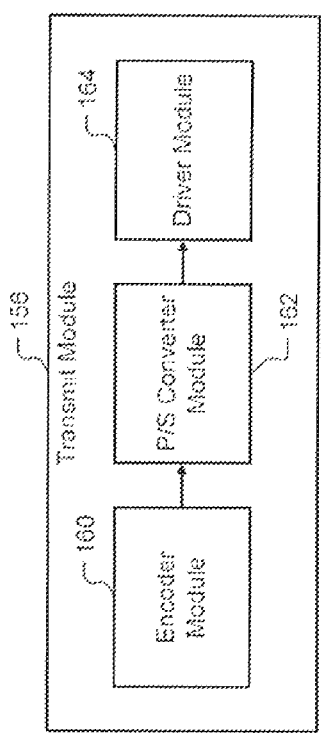
FIG. 3A is a functional block diagram of transmit module according to the present disclosure.
Figure 3B:
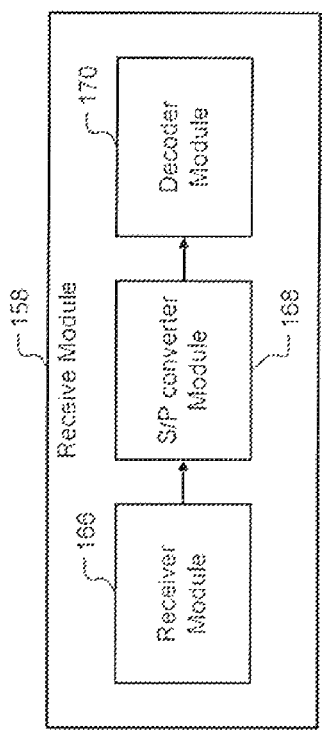
FIG. 3B is a functional block diagram of receive module according to the present disclosure.

Referring now to FIGS. 3A and 3B, the transmit module 156 and the receive module 158 of the mobile device 102 are shown in greater detail. In FIG. 3A, the transmit module 156 includes an encoder module 160, a parallel-to-serial converter module 162, and a driver module 164. The encoder module 160 encodes data to be transmitted from the mobile device 102 to the remote device 104 using a suitable coding scheme. For example only, the encoder module 160 may include an 8-bit-to-10-bit encoder. The encoder module 160 outputs the encoded data to the parallel-to-serial converter module 162. The parallel-to-serial converter module 162 converts the encoded data from a parallel format to a serial format. The driver module 164 includes differential line drivers that drive the two transmit pins TX+ and TX−. The two transmit pins TX+ and TX− transmit the serial data to the remote device 104.

In FIG. 3B, the receive module 158 includes a receiver module 166, a serial-to-parallel converter module 168, and a decoder module 170. The receiver module 166 receives serial data transmitted by the remote device 104 via the two receive pins RX+ and RX−. The serial-to-parallel converter module 168 converts the received data from the serial format to the parallel format. The decoder module 170 decodes the received data. For example only, the decoder module 170 may include a 10-bit-to-8-bit decoder.

Figure 4C:
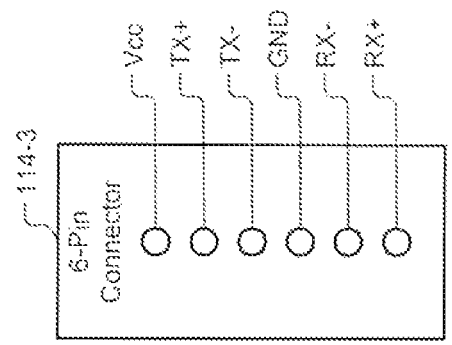
FIGS. 4A-4C depict different configurations of a connector according to the present disclosure.
Figure 4B:
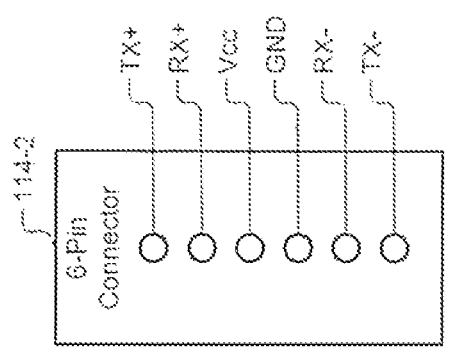
Figure 4A:
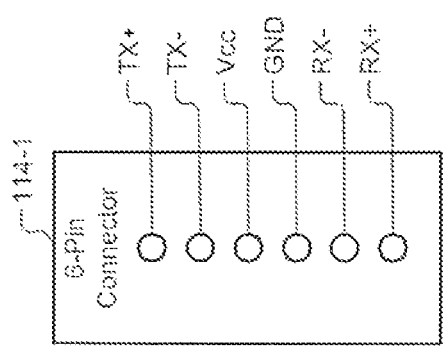

Referring now to FIGS. 4A-4C, non-limiting examples of the connector 114 of the mobile device 102 are shown. The 6 pins of the connector 114 may be arranged in many different ways as shown. Additional arrangements are contemplated. Different arrangements may provide different advantages. For example, one arrangement may be more suitable than others from manufacturing standpoint while another arrangement may be more suitable than others from the standpoint of reducing noise (e.g., echo, crosstalk, etc.) between the 6 pins of the 6-pin connector 114.

In some implementations, a 6-conductor cable can be used to connect the mobile device 102 to the remote device 104 via the 6 pins of connectors 114, 116. The 6-conductor cable can have two 6-pin connectors; a first 6-pin connector that resembles the connector 116 of the remote device 104 and a second 6-pin connector that resembles the connector 114 of the mobile device 102.

The first 6-pin connector that resembles the connector 116 of the remote device 104 can be plugged into the connector 114 of the mobile device 102. The second 6-pin connector that resembles the connector 114 of the mobile device 102 can be plugged into the connector 116 of the remote device 104. The length of the cable is determined by the electrical properties of the driver module 164, the receiver module 166, and the material used to manufacture the cable.

When the mobile device 102 is connected to the remote device 104 using the cable, the sensing module 154 can sense when the cable is plugged into the connector 114 of the mobile device 102 and into the connector 116 of the remote device 104. Additionally, the sensing module 154 can sense the cable is unplugged from the connector 114 of the mobile device 102 or from the connector 116 of the remote device 104.

In some implementations, the remote device 104 can include a dongle that is attached to the mobile device 102 via the connector 114. A dongle is a hardware device that, when plugged into a computing device, enables a specific copy-protected program to run on the computing device. The program is disabled on the computing device when the hardware device is not plugged into the computing device. The hardware device is effective against software piracy. When the dongle is attached to the mobile device 102 via the connector 114, the dongle can receive power from the battery 106 of the mobile device 102. The dongle can provide additional functionality to an application executed by the mobile device 102.

A connector having a reduced pin-count (e.g., 6 pins as shown, or 4 pins as described above) provides many benefits including reduced component count, reduced power consumption, and reduced size. For example, the power consumption of the PHY module 112 is reduced since neither additional pins nor corresponding additional logic is necessary to detect connection and disconnection of the mobile device 102. Further, using the connector 114 also helps in maintaining the compactness of the mobile device 102. Further, using PCIe protocol to communicate with the remote device 104 via the connector 114 allows the mobile device 102 and the remote device 104 to utilize many other PCIe-based hardware and software that have been already developed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A first device comprising:
    a battery;
    a first connector configured to connect the first device to a second device, wherein the first connector includes a power supply pin, a ground pin, two transmit pins, and two receive pins, and wherein the two transmit pins are separate from the two receive pins;

a charging module configured to
  receive power from the second device via the power supply pin and the ground pin to charge the battery, and
  supply power from the battery to the second device via the power supply pin and the ground pin;
a sensing module configured to
  sense the power supply pin and the ground pin of the first connector, and
  based on the sensing, detect when the first device (i) connects to the second device via the first connector and (ii) disconnects from the second device; and
a communication module configured to
  transmit data to the second device via the two transmit pins using a Peripheral Component Interconnect Express protocol, and
  receive data from the second device via the two receive pins using the Peripheral Component Interconnect Express protocol.

2. The first device of claim 1, wherein the first connector consists of:
  the power supply pin,
  the ground pin,
  the two transmit pins, and
  the two receive pins.

3. The first device claim 1, wherein the communication module is further configured to transmit and receive data in full duplex mode.

4. A system comprising:
  the first device of claim 1; and
  the second device,
  wherein the second device includes a second connector configured to connect to the first connector of the first device, and
  wherein the second device comprises a docking station, a charging station, or a laptop computer.

5. The system of claim 4, further comprising:
  a cable consisting of six conductors,
  wherein the cable includes
    a third connector configured to plug into the first connector of the first device, and
    a fourth connector configured to plug into the second connector of the second device, and
  wherein the sensing module is further configured to detect, based on the sensing, (i) when the first device connects to the second device via the cable and (ii) when the third connector of the cable disconnects from the first connector of the first device or the fourth connector of the cable disconnects from the second connector of the second device.

6. A first device comprising:
a battery;
a first connector configured to connect the first device to a second device, wherein the first connector includes two transmit pins and two receive pins;
a charging module configured to
  receive power from the second device via one or more of the two transmit pins and the two receive pins to charge the battery, and
  supply power from the battery to the second device via the one or more of the two transmit pins and the two receive pins; and
a communication module configured to
  transmit data to the second device via the two transmit pins, and
  receive data from the second device via the two receive pins,
  wherein power is received or supplied when data communication does not occur over the one or more of the two transmit pins and the two receive pins.

7. The first device of claim 6, wherein the first connector consists of:
  the two transmit pins, and
  the two receive pins.

8. The first device of claim 6, wherein the communication module further comprises:
  a transmit module configured to transmit data to the second device via the two transmit pins using a Peripheral Component Interconnect Express protocol; and
  a receive module configured to receive data from the second device via the two receive pins using the Peripheral Component Interconnect Express protocol.

9. The first device claim 8, wherein the transmit module and the receive module are further configured to transmit and receive data in full duplex mode.

10. A system comprising:
  the first device of claim 6; and
  the second device,
  wherein the second device includes a second connector configured to connect to the first connector of the first device, and
  wherein the second device is configured to augment functionality of an application executed by the first device.

11. The system of claim 10, wherein the second device comprises a docking station, a charging station, or a laptop computer.

12. The system of claim 10, further comprising:
  a cable consisting of four conductors,
  wherein the cable includes
    a third connector configured to plug into the first connector of the first device, and
    a fourth connector configured to plug into the second connector of the second device.

13. A system comprising:
  a first device having a first connector; and
  a second device having a second connector,
  wherein each of the first connector and the second connector consists of
    two transmit pins, and
    two receive pins,
  wherein when the first device is connected to the second device via the first connector and the second connector, the first device is configured to
    receive power from the second device via one or more of the two transmit pins and the two receive pins of the first connector to charge a battery of the first device,
    supply power to the second device via the one or more of the two transmit pins and the two receive pins of the first connector,
    transmit data to the second device via the two transmit pins of the first connector, and
    receive data from the second device via the two receive pins of the first connector,
    wherein power is received or supplied when data communication does not occur over the one or more of the two transmit pins and the two receive pins.

14. The system of claim 13, wherein the first device is further configured to:
  transmit data to the second device using a Peripheral Component Interconnect Express protocol,
  receive data from the second device using the Peripheral Component Interconnect Express protocol, and
  transmit and receive data in full duplex mode.

15. The system of claim 13, wherein the second device is configured to augment functionality of an application executed by the first device.

16. The system of claim 13, wherein:
the first device includes a mobile device; and
the second device comprises a docking station, a charging station, or a laptop computer.

17. The system of claim 13, further comprising:
a cable consisting of four conductors,
wherein the cable includes
- a third connector configured to plug into the first connector of the first device, and
- a fourth connector configured to plug into the second connector of the second device.

* * * * *